United States Patent
Wolf

[15] 3,677,375
[45] July 18, 1972

[54] VEHICLE BRAKE

[72] Inventor: Lloyd J. Wolf, 2425 Irving Blvd., Dallas, Tex. 75207

[22] Filed: Aug. 31, 1970

[21] Appl. No.: 68,164

[52] U.S. Cl. .................................... 188/138, 188/72.7
[51] Int. Cl. .................................................... F16d 65/34
[58] Field of Search ........................... 188/72.7, 136–138

[56] References Cited

UNITED STATES PATENTS

| | | | |
|---|---|---|---|
| 1,696,879 | 12/1928 | Chase | 188/138 |
| 2,365,726 | 12/1944 | Penrose | 188/138 X |
| 2,649,941 | 8/1953 | Doebeli | 188/138 X |

FOREIGN PATENTS OR APPLICATIONS 111,544   7/1965   Netherlands...................188/72.7

Primary Examiner—Duane A. Reger
Attorney—Bedell and Burgess

[57] ABSTRACT

A vehicle brake of the spread shoe type is provided with a ball spreading device for spreading the shoes into braking engagement with a pair of spaced apart disks, there being a lever operatively connected at one end to the latter and at the other end mounting an electromagnet in proximity to one of the disks whereby upon energization of the electromagnet the lever follows the disk, causing the balls to spread and thereby spreading the shoes into braking engagement with the disks.

6 Claims, 4 Drawing Figures

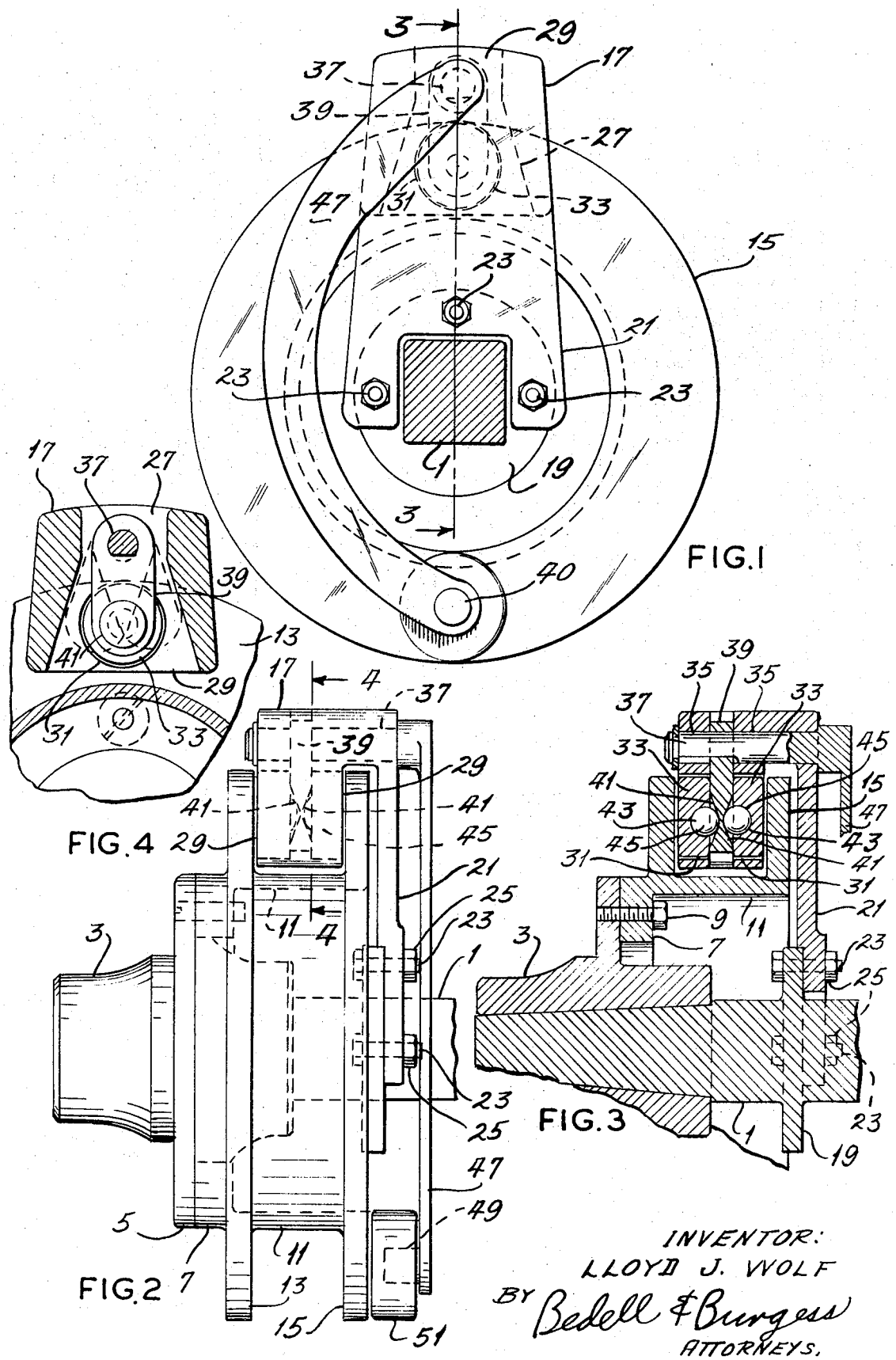

VEHICLE BRAKE

BACKGROUND OF THE INVENTION

1. Field of the Invention

The invention relates to vehicle brakes of the spread shoe double disk type.

2. The Prior Art

Conventional drum brakes have been provided in which the toggle actuating devices have been actuated by a lever provided with an electromagnet on its free end to cause it to follow the brake drum when the electromagnet was energized, and ball actuated spread shoe disk brakes have also been provided. None of the prior art, however, discloses a brake utilizing a lever electromagnetically connected to the brake rotor for spreading balls to actuate a brake.

SUMMARY OF THE INVENTION

The invention provides an improved means in a disk brake of the spread shoe type for spreading balls to expand the shoes, whereby the high mechanical advantage of the spread ball shoe expander is enhanced by the use of a long lever actuated by the torque of the wheel on which the brake is mounted. Instantaneous response is achieved without the use of long hydraulic lines or mechanical linkages between the driver's location and the wheel by the provision of an electromagnet on the lever, which requires a simple electrical connection to the operator's or driver's station. This feature also facilitates remote control from the pulling vehicle of the brakes on a trailer.

BRIEF DESCRIPTION OF THE DRAWING

FIG. 1 is an inside elevational view of a brake embodying the invention.

FIG. 2 is an end elevational view of the brake illustrated in FIG. 1.

FIG. 3 is a fragmentary vertical sectional view along line 3—3 of FIG. 1.

FIG. 4 is a fragmentary vertical sectional view along line 4—4 of FIG. 2.

DESCRIPTION OF THE PREFERRED EMBODIMENT

The numeral 1 denotes a fixed axle of an automotive vehicle such as a trailer, on the end of which is rotatably journaled wheel hub 3. Hub 3 is formed with an annular flange 5, and brake rotor, comprising an annular plate 7, secured in abutting relation to flange 5 by bolts 9, and a cylindrical portion of channel cross section having a cylindrical web 11 connecting spaced radial flanges 13 and 15, the opposed inner surfaces of which form the brake disks.

For nonrotatably supporting the brake stator 17, axle 1 is formed with a radial flange 19 inboard of rotor inboard flange 15 and stator mounting arm 21 is rigidly secured to flange 19 by bolts 23 and nuts 25. Stator mounting arm 21 extends radially upwardly from axle 1 and parallel to axle 1 over the top of rotor inboard flange 15, where it merges with stator 17 which intrudes between rotor flanges 13 and 15.

Stator 17 is a block formed with a vertical cavity 27 defined by flat side walls 29 parallel to rotor flanges 13 and 15. Side walls 29 are formed with aligned circular apertures 31, and circular shoes 33 are slidably mounted in apertures 31 for free movement axially of the apertures toward and away from the disks formed by the inner surfaces of rotor flanges 13 and 15.

For producing movement of shoes 33 into frictional braking engagement with disks 13 and 15, stator 17 is formed with a cylindrical bore 35 parallel to the common axis of apertures 31 and shoes 33 and a shaft 33 is rotatably journaled in bore 35, and rigidly mounts, in cavity 27 between side walls 29, a short plate-like arm 39, the lower end of which is formed in its surfaces abutting shoes 33, with shallow V-shaped or conical depressions 41.

Shoes 33 are centrally recessed at 43 on their inner surfaces in alignment with depressions 41 in arm 39 to form sockets for small hard metal balls 45, the depth of sockets 43 being such that when balls 45 are fully seated in them and in conical depressions 41 in arm 39, the shoes will not be in forced frictional engagement with rotor flanges 13 and 15, but when shaft 37 is rotated in either direction, causing corresponding movement of arm 39, the conical surfaces of depressions 41 engage balls 45 to press the latter, and with them shoes 33, outwardly until the latter frictionally engage rotor flanges 13 and 15 thereby braking the wheel on which rotor 7, 11, 13, 15 is mounted.

For actuating arm 19 to cause the braking action described above, inboard of stator mounting arm 21, shaft 37 mounts a long lever 47, of arcuate shape to clear axle 1, which terminates below the latter adjacent rotor flange 15, substantially 180° from its shaft 37. At its lower end lever 47 is formed with a cylindrical boss 49 extending parallel to axle 1 toward rotor flange 15, and a disk-shaped electromagnet 51, of similar diameter to the radial length of rotor flange 15, is mounted on boss 49 in close proximity to rotor flange 15, so that upon energization of electromagnet 51, it is attracted to rotor flange 15 and follows it in rotation, pulling lever 47 in the same direction and causing corresponding pivoting of shaft 37 and arm 39 with consequent disalignment of conical depressions 41 and balls 45, and resultant outward movement of shoes 33 into frictional braking engagement with the disks formed by the inner opposing surfaces of rotor flanges 13 and 15.

It will be evident from the drawing and the foregoing description that the brake action will be the same irrespective of the direction of rotation of the rotor, and that it will be so nearly instantaneous that very little movement of lever 47 will occur.

This arrangement provides very powerful braking force, because the torque on shaft 37 and arm 39 is the product of the length of lever 47 by the rotational force applied to its lower end, through electromagnet 51, and the pressure applied to the shoes is further enhanced by the mechanical advantage of the sloping surfaces of conical depressions 41 in arm 39.

The details of the brake may be modified substantially without departing from the spirit of the invention and the exclusive use of any modifications as come within the scope of the appended claims is contemplated.

I claim:

1. A vehicle brake comprising a rotor having a pair of axially spaced disks, an element nonrotatably positioned between said disks with a mounting portion radially outwardly of said disks, a pair of axially aligned shoes carried between the disks by said nonrotatable element for axial movement only thereof toward and away from the respective disks, said shoes being axially spaced from each other and having rounded projections from their opposing surfaces, an axial shaft rotatably mounted in said nonrotatable element radially outwardly of said disks, an arm rigidly mounted on said shaft and extending radially inwardly between said shoes and having shallow V-shaped depressions in its opposite surfaces normally receiving said shoe projections, a lever rigidly connected at one end to said shaft and mounting an electromagnet at its other end near the periphery of one of said disks at a location angularly remote from said nonrotatable element whereby, upon energization of said magnet, rotation of said rotor is imparted to said lever and thereby to said arm to force said shoe projections outwardly of said arm depressions and cause said shoes to brakingly engage said disks.

2. A vehicle brake according to claim 1 wherein each said shoe is formed with a ball socket in its surface opposing said other shoe, and a ball is seated in each said socket with a portion projecting from the face of the shoe, said rounded projections comprising the projecting portions of said balls.

3. A vehicle brake according to claim 2 wherein said arm depressions are of conical shape.

4. A vehicle brake according to claim 3, including a nonrotatable axle structure, wheel structure rotatably journaled thereon, said rotor being rigidly secured to said wheel structure, said nonrotatable element being rigidly connected to said axle structure.

5. A vehicle brake according to claim 4, including a radial arm rigidly secured at its inner end to said axle structure inboard from said rotor and rigidly secured at its outer end to said nonrotatable element to mount the same on said axle.

6. A vehicle brake according to claim 5 wherein said shaft extends inboard from said mounting arm and said lever is mounted on the end thereof, said electromagnet being disposed on the opposite side of said axle from said nonrotatable element, said lever being curved in a plane normal to said axle to clear said axle.

* * * * *